US010623239B1

United States Patent
Li et al.

(10) Patent No.: US 10,623,239 B1
(45) Date of Patent: Apr. 14, 2020

(54) MULTIPLE ANTENNA TELEMATICS CONTROLLER RADIO RECOVERY

(71) Applicant: FORD GLOBAL TECHNOLOGIES, LLC, Dearborn, MI (US)

(72) Inventors: Jing Li, Kanata (CA); Jun Xu, Kanata (CA)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/282,988

(22) Filed: Feb. 22, 2019

(51) Int. Cl.
*H04W 4/40* (2018.01)
*H04L 12/24* (2006.01)
(Continued)

(52) U.S. Cl.
CPC ........ *H04L 41/0677* (2013.01); *H04B 7/04* (2013.01); *H04B 17/318* (2015.01); *H04W 4/40* (2018.02)

(58) Field of Classification Search
CPC ............ G07C 5/008; G07C 2205/02; G07C 9/00309; G07C 2009/00769; G07C 2009/00865; G07C 5/0808; G07C 5/0816; G07C 9/00571; G07C 5/085; H01Q 1/3275; H01Q 21/30; H01Q 21/28; H01Q 1/241; H01Q 5/385; H01Q 5/392; H01Q 9/0435; H01Q 9/0457; H01Q 5/00; H01Q 1/243; H01Q 5/364; H01Q 5/371; H01Q 25/00; H01Q 25/04; H01Q 13/10; H01Q 1/38; H01Q 5/307; H01Q 1/523; H01Q 1/3208; H04L 67/12; H04L 2209/84; H04L 5/08; H04L 1/00; H04L 1/0075; H04L 1/06; H04L 67/2823; H04L 69/08; H04L 9/0866; H04L 12/1836; H04L 63/102; H04L 67/28; H04L 67/322; H04L 41/0889; H04L 41/5003; H04L 51/38; H04L 65/80; H04L 67/16; H04L 1/0057; H04L 1/0065; H04L 1/0054; H04L 1/0061; H04L 1/0071; H04L 2001/0093; H04L 45/122; H04L 47/2441; H04L 67/34; H04L 7/00; H04W 4/02; H04W 4/021; H04W 4/046; H04W 4/90; H04W 4/04; H04W 64/00; H04W 88/06; H04W 76/50; H04W 84/005; H04W 84/22; H04W 36/14; H04W 36/30; H04W 36/32; H04W 48/04; H04W 4/38; H04W 4/40; H04W 4/44; H04W 88/10; H04W 28/0268; H04W 40/24; H04W 8/22; H04W 4/80;
(Continued)

(56) References Cited

U.S. PATENT DOCUMENTS 6,119,003 A * 9/2000 Kukkohovi ........... H04W 48/18
455/435.2
6,430,404 B1 * 8/2002 Lindenmeier ........ H04B 7/0808
455/132

(Continued)

*Primary Examiner* — Nimesh Patel
(74) *Attorney, Agent, or Firm* — Michael J. Spenner; Brooks Kushman P.C.

(57) ABSTRACT

A plurality of antennas includes a primary antenna assigned as a primary receiver (PRX) and for transmission (TX), and a secondary antenna assigned as a diversity receiver (DRX). A telematics controller is programmed to, responsive to the primary antenna being degraded in received signal strength indication (RSSI) in excess of a predefined threshold amount compared to the RSSI of the secondary antenna, swap assignment of the primary antenna and the secondary antenna.

18 Claims, 3 Drawing Sheets

(51) Int. Cl.
*H04B 7/04* (2017.01)
*H04B 17/318* (2015.01)

(58) Field of Classification Search
CPC ..... H04W 76/10; H04W 84/12; H04W 48/16; H04W 48/18; H04W 4/00; H04W 72/005; H04W 72/0446; H04W 40/02; H04W 24/04; H04W 56/0045; H04W 28/10; H04W 72/04; H04B 7/0413; H04B 7/0802; H04B 15/00; H04B 15/06; H04B 1/005; H04B 1/006; H04B 1/3822; H04B 1/406; H04B 3/02; H04B 7/14; H04B 1/086; H04B 7/0825; H04B 7/0404; H04B 7/0617; H04B 7/18563; H04M 1/72569; H04M 1/6091; H04M 2250/12; H04M 1/72522; H04M 11/04; H04M 1/6083; H04M 3/5116; H04M 7/006; Y02T 90/16; Y02T 10/7044; Y02T 10/705; Y02T 10/7055; Y02T 10/7077; Y02T 90/163; Y02T 90/168; Y02T 90/169; G06F 13/102; G06F 13/4022; G06F 13/4282; G06F 16/29; G06F 17/00; G06F 2213/0042; B60L 2240/62; B60L 2240/622; B60L 2240/625; B60L 2250/12; B60L 3/12; B60L 53/305; B60W 20/50; B60W 10/06; B60W 10/08; B60W 20/12; B60W 20/40; B60W 40/00; B60W 20/13; B60W 2510/244; B60R 2300/105; B60R 11/0241; B60R 11/0247; B60R 2001/1215; B60R 2001/1223; B60R 2001/1284; B60R 2011/0294; B60R 21/01566; B60R 2300/302; B60R 2300/406; B60K 2370/52; B60K 2370/55; B60K 2370/589; B60K 2370/592; H04H 20/57; H04H 20/22; H04H 2201/60; H04H 60/51; H04H 40/27; H04H 20/62
See application file for complete search history.

(56) References Cited

U.S. PATENT DOCUMENTS

| | | | |
|---|---|---|---|
| 8,064,960 B2 | 11/2011 | Wisnewski et al. | |
| 9,730,041 B2 | 8/2017 | Choi | |
| 10,003,361 B2 | 6/2018 | Kim | |
| 2002/0006810 A1* | 1/2002 | Schiller | H01Q 21/30 455/552.1 |
| 2010/0164790 A1* | 7/2010 | Wisnewski | H01Q 1/3208 455/67.11 |
| 2011/0069680 A1* | 3/2011 | Krause | H04W 48/16 370/332 |
| 2011/0077059 A1* | 3/2011 | Kim | H04W 52/0274 455/574 |
| 2013/0217384 A1* | 8/2013 | Snider | H04W 24/10 455/434 |
| 2015/0271721 A1 | 9/2015 | Venkatachari et al. | |
| 2016/0173172 A1* | 6/2016 | Greene | H04B 7/0404 455/562.1 |
| 2018/0300816 A1* | 10/2018 | Perl | G06Q 50/01 |

* cited by examiner

MULTIPLE ANTENNA TELEMATICS CONTROLLER RADIO RECOVERY

TECHNICAL FIELD

Aspects of the disclosure generally relate to telematics controller radio recovery and, more specifically, to recovery of radio functionality responsive to damage to a cellular antenna.

BACKGROUND

The rapid development of the connected vehicle has changed the automotive industry. Connected vehicles already use production cellular networks to support emergency response, in-car WiFi hotspots, and infotainment, among other features. However, the current cellular network or radio protocol is optimized for mobile devices, for example for better battery life of the cellphone, not for vehicles.

SUMMARY

In one or more illustrative examples, a system includes a plurality of antennas including a primary antenna assigned as a primary receiver (PRX) and for transmission (TX), and a secondary antenna assigned as a diversity receiver (DRX). The system also includes a telematics controller programmed to, responsive to the primary antenna being degraded in received signal strength indication (RSSI) in excess of a predefined threshold amount compared to the RSSI of the secondary antenna, swap assignment of the primary antenna and the secondary antenna.

In one or more illustrative examples, a method includes transitioning a telematics controller of a vehicle to a first mode in which the telematics controller is configured to measure received signal strength indication (RSSI) of both a primary antenna and a secondary antenna responsive to the vehicle entering a motive mode; responsive to the primary antenna being degraded in RSSI in excess of a predefined threshold amount compared to the RSSI of the secondary antenna, swapping assignment of the primary antenna and the secondary antenna; and transitioning the telematics controller to a second mode in which the telematics controller is configured to measure RSSI of the primary antenna but not the secondary antenna responsive to the vehicle exiting the motive mode.

In one or more illustrative examples, a non-transitory computer readable medium includes instructions that, when executed by a processor of a telematics controller, cause the telematics controller to transition to a first mode in which the telematics controller is configured to measure received signal strength indication (RSSI) of both a primary antenna and a secondary antenna responsive to the vehicle entering a motive mode; responsive to the primary antenna being degraded in RSSI in excess of a predefined threshold amount compared to the RSSI of the secondary antenna, swap assignment of the primary antenna and the secondary antenna; and transition to a second mode in which the telematics controller is configured to measure RSSI of the primary antenna but not the secondary antenna responsive to the vehicle exiting the motive mode.

DETAILED DESCRIPTION

Figure 1:
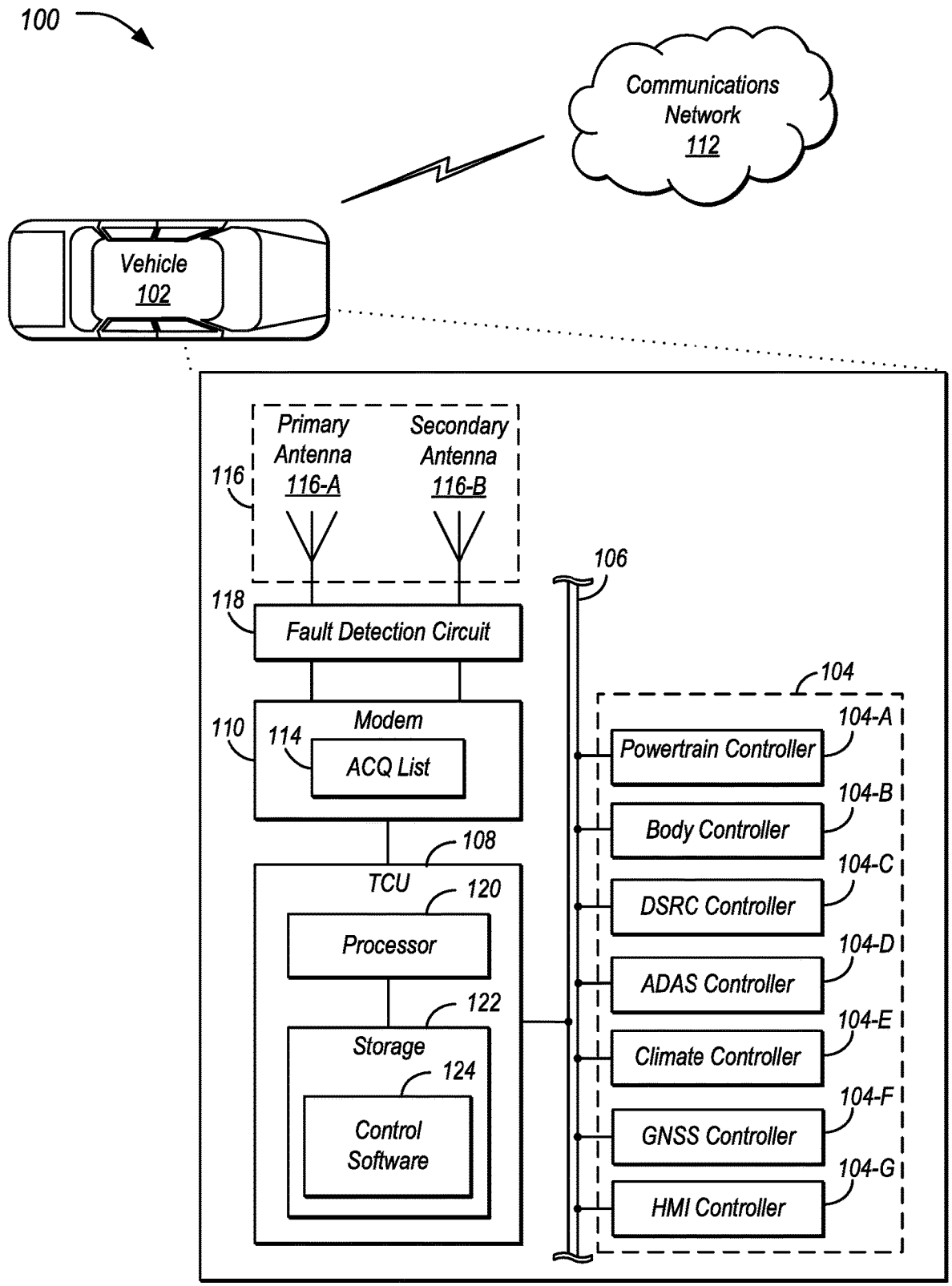
FIG. 1 illustrates an example system for performing telematics controller radio recovery for a vehicle having multiple antennas.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A telematics controller (often referred to as a TCU) may be designed to have at least two cellular antennas. These antennas may include a primary cellular antenna and a secondary cellular antenna. During normal operation, the primary antenna is used as a primary receiver (PRX) and for transmission (TX), while the secondary antenna is used as a diversity receiver (DRX).

Antenna fault detection may be implemented in the hardware of the TCU. For example, the hardware may include a hardware diagnostic circuit configured to measure the voltage of the cellular antennas. When an antenna fault is detected using the diagnostic circuit, a diagnostic trouble code (DTC) may be generated by the TCU. An antenna swap architecture may additionally be implemented in the hardware of the TCU. When the TCU software receives a primary antenna DTC, the software may be programmed to cause the TCU to switch PRX/TX from primary antenna to the secondary radio frequency (RF) path. Moreover, the software may also notify the modem software not to use the non-functional primary antenna for further communications.

However, the hardware diagnostic circuit typically can only detect open and short electrical states of the antenna hardware connection. These two states can only cover a small part of antenna damage scenarios. In most cases, when the primary antenna is distorted the hardware diagnostic circuit cannot detect the damage. Yet, this distortion can change the antenna impedance which could lead to partial non-function of the antenna.

When the primary antenna is damaged but not fully opened or shorted, there may be no mechanism to perform a fast recovery of the radio connection. Accordingly, TCUs may continue to use the default primary cellular antenna hardware for radio although the hardware might be damaged. Existing software may try to decode the recent good channels in the history for the damaged hardware. In doing so, the system may waste energy and time as the recent good channels or frequencies with the original good antenna hardware may no longer be valid information for future frequency searches if the antenna hardware is damaged or changed.

When a vehicle incident occurs that damages but does not destroy the cellular antenna of the vehicle, it may be desirable to perform a fast recovery of the radio connection so that the vehicle or TCU can successfully launch eCalls or other emergency communications. In other words, it may be desirable to optimize the radio software and hardware design for reliable radio services on connected vehicles that may incur partial antenna damage.

While the antenna fault detection circuit may be unable to detect an antenna with partial antenna damage, the damaged antenna may not work for the whole band of frequencies for which it is designed to operate. For example, the antenna may be non-functional in the lower-band frequencies, but some higher-band frequencies may survive. Antenna switching decisions may be made based on received signal strength indication (RSSI) measurements of signal strength performed by the software. In a traditional radio protocol, the TCU measures both PRX and DRX strength in LTE idle mode, but measures only PRX signal strength in other WCDMA/GSM/CDMA idle modes so as to save battery usage. However, when the TCU is in ignition-on mode, the TCU may switch the modem into non-battery-saver mode. When TCU is in ignition-off mode however, the TCU may notify the modem to return to the normal battery-saver mode.

When the modem is in a non-battery-saver mode, some battery saving features in the modem software may be disabled to provide for more reliable radio services. The modem software can be forced to continue measuring PRX and DRX strength continuously, especially in WCDMA/GSM mode as eCall or emergency call will be launched in the circuit switch network. During normal conditions where the antennas are undamaged, DRX RSSI would be expected to be a little worse than PRX RSSI, as the PRX RF routing would typically use the optimal path in the hardware design. If a vehicle incident occurs that damages one or both of the antennas, the software may be programmed to monitor in real-time for changes in the PRX RSSI and DRX RSSI measurements. For example, if the averaged RSSI delta between DRX and PRX is larger than a switching threshold (e.g., 10 dB), antenna switching may be triggered. In other words, responsive to detection that the primary antenna performance is worse than the performance of the secondary antenna, the software may be programmed to determine that the primary antenna may be damaged, and accordingly, switch PRX/TX to the secondary antenna RF path.

In some instances, both the primary antenna and the secondary antenna may become damaged. As one possibility, both antennas may be damaged such that decoding of transmissions in both PRX and DRX fail, causing the modem to fall into an SOS mode. In such a situation, the TCU may be configured to identify the best frequency to camp onto the network with a damaged, but partially functional, antenna. During system selection and acquisition (ACQ), the modem may use both PRX and DRX instead of PRX only in a traditional radio protocol, as the damage to the antennas may be unknown. A normally-preferred ACQ list may include entries corresponding to the recent good channels in the history for GSM/WCDMA/LTE technology communications or from a PRL (Preferred Roaming List) for a CDMA technology communications.

Responsive to the TCU detecting an event that could result in antenna damage, the TCU may notify the modem so that the modem software can reorder frequencies in the preferred ACQ list. For instance, in one example a serving cell channel may be in a low-frequency band. Responsive to detection if a dramatic RSSI drop in both PRX and DRX (e.g., due to a vehicle incident occurring), it may be determined that both antennas may become non-functional in the low band frequencies. Accordingly, in the ACQ process, high band frequencies may be given a higher priority in the preferred ACQ list so that TCU would not waste resources attempting to decode low band channels. Thus, TCU may be updated to camp onto the network more quickly after a situation in which both antennas are damaged.

FIG. 1 illustrates an example system 100 for performing telematics controller radio recovery for a vehicle 102 having multiple antennas 116. As illustrated, the vehicle 102 includes a plurality of vehicle controllers 104 in communication over one or more vehicle buses 106. The vehicle 102 further includes a telematics control unit (TCU) 108 configured to access a communications network 112 using a modem 110 having at least a primary antenna 116-A and a secondary antenna 116-B. The modem 110 may connect to the antennas 116 via a fault detection circuit 118, and may maintain an ACQ list 114 of preferred frequencies for the modem to use via the antennas 116. The TCU 108 may execute control software 124 to cause the TCU 108 to monitor in real-time for changes in RSSI measurements from the antennas 116, as well as monitor the vehicle buses 106 for messaging indicative of an event that could involve damage to the antennas 116. If there is a change in RSSI or an indication of such an event, the control software 124 may be programmed to cause the TCU 108 to switch which antenna 116 is the primary antenna, and/or notify the modem 110 to reorder frequencies in the preferred ACQ list 114. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an Advanced Driver Assistance Systems (ADAS) controller 104-D may configured to support stability control, automatic braking, and other driver assistance functions; a climate control management controller 104-E may be configured to provide control of heating and cooling system components (e.g., compressor clutch, blower fan, temperature sensors, etc.); a global navigation satellite system (GNSS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle controllers 104, as well as between the TCU 108 and the vehicle controllers 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle controllers 104 and with other devices of the system 100. For example, the TCU 108 may include or otherwise access a cellular modem 110 configured to facilitate communication with a communications network 112. The communications network 112 may include one or more interconnected networks such as the Internet, a cable television distribution network, a satellite link network, a local area network, and a telephone network, as some non-limiting examples.

The modem 110 may include a memory on which data and/or computer-executable instructions may be maintained. In an example, the modem 110 may include memory on which the ACQ list 114 is maintained. The ACQ list 114 refers to a data structure that includes information indicative of a plurality of frequencies for camping by the modem 110. The ACQ list 114 may also imply an ordering. In one example, frequencies higher in the ACQ list 114 are given a higher priority than frequencies lower in the list, such that when the modem 110 attempts to locate a frequency to use, the modem 110 begins with the frequencies of higher priority.

The antennas 116 may include an array of conductors or elements that are electrically connected to a receiver or transmitter to serve as an interface between radio waves propagating through space and electric currents moving in metal conductors. The modem 110 may utilize at least a primary antenna 116-A and a secondary antenna 116-B to perform wireless radio communication with base stations of the communications network 112. In one example, the primary antenna 116 and/or the secondary antenna 116 may be mounted to the roof of the vehicle 102. During normal operating conditions, the primary antenna 116-A is used as primary receiver (PRX) and for transmission (TX), while the secondary antenna 116-B is used as a diversity receiver (DRX). In general, the primary antenna 116-A may be the antenna 116 having a more optimal signal path in the hardware design as compared to the secondary antenna 116-B such that signal strength is generally better to the primary antenna 116-A. While two antennas are shown in the system 100, in other examples, the modem 110 may be configured to utilize three or more antennas 116 that may be switched among primary and secondary roles.

The fault detection circuit 118 may be an electrical circuit configured to detect physical damage to the antennas 116. In an example, the fault detection circuit 118 may be configured to measure a voltage across each of the cellular antennas 116. A change in the voltage that is identified may occur responsive to a fault condition occurring for an antenna 116 such as a short or an open condition. If such a fault is detected, the TCU 108 may raise a diagnostic trouble code (DTC).

The TCU 108 may further include various types of computing apparatus in support of performance of the functions of the TCU 108 described herein. In an example, the TCU 108 may include one or more processors 120 configured to execute computer instructions, and a storage 122 medium on which the computer-executable instructions and/or data may be maintained. A computer-readable storage medium (also referred to as a processor-readable medium or storage 122) includes any non-transitory (e.g., tangible) medium that participates in providing data (e.g., instructions) that may be read by a computer (e.g., by the processor(s)). In general, the processor 120 receives instructions and/or data, e.g., from the storage 122, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of DTC data and/or other vehicle information from the vehicle controllers 104 connected to the one or more vehicle buses 106. While only a single bus 106 is illustrated, it should be noted that in many examples, multiple vehicle buses 106 are included, with a subset of the controllers 104 connected to each bus 106. Accordingly, to access a given controller 104, the TCU 108 may be configured to maintain a mapping of which buses 106 are connected to which controllers 104, and to access the corresponding bus 106 for a controller 104 when communication with that particular controller 104 is desired.

The control software 124 may be one application included on the storage 122 of the TCU 108. The control software 124 may include instructions that, when executed by the processor 120 of the TCU 108, cause the TCU 108 to perform functions in relation to the setup, teardown, and maintenance of data communications channels to the communications network 112. In an example, the control software 124 may be configured to monitor in real-time for changes in RSSI measurements from the antennas 116, as well as monitor the vehicle buses 106 for messaging indicative of an event that could involve damage to the antennas 116. If there is a change in RSSI or an indication of such an event, the control software 124 may be programmed to cause the TCU 108 to switch which of the antennas 116 is the primary antenna 116-A, and/or notify the modem 110 to reorder frequencies in the preferred ACQ list 114.

Figure 2:
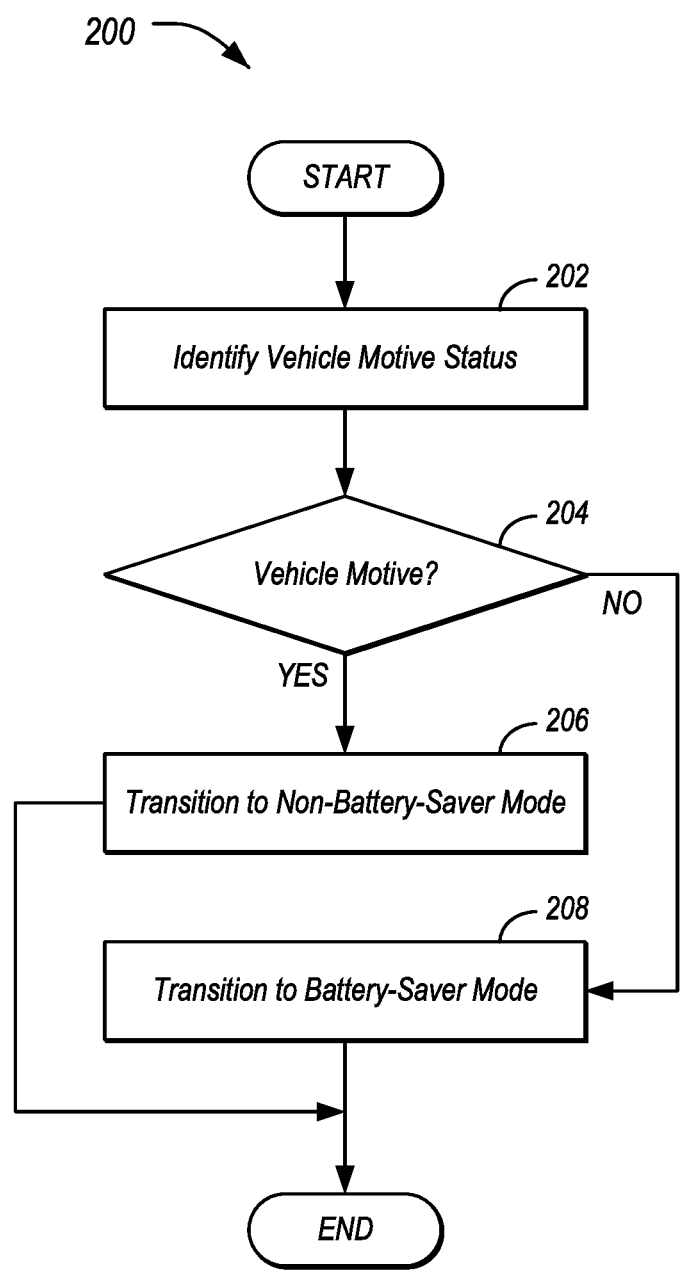
FIG. 2 illustrates an example process for transitioning the telematics controller between battery-saver mode and non-battery-saver mode.

FIG. 2 illustrates an example process for transitioning the TCU 108 between battery-saver mode and non-battery-saver mode. In an example, the process 200 may be performed by the TCU 108 executing the control software 124 on the one or more processors 120. It should be noted that the process 200 may be performed periodically or continuously to allow for up-to-date transitioning of the TCU 108 between the battery-saver mode and the non-battery-saver mode.

At operation 202, the TCU 108 identifies the vehicle 102 ignition status. In an example, the TCU 108 identifies over the vehicle bus 106 from the powertrain controller 104-A whether the vehicle is in a motive mode in which the vehicle 102 may move (e.g., ignition on, electric vehicle 102 in a drive mode, etc.) or in a non-motive mode (e.g., ignition off). This information may be identified by monitoring messaging over the vehicle bus 106 or by the TCU 108 querying the powertrain controller 104-A for the status and receiving a response over the vehicle bus 106.

At 204, the TCU 108 determines whether the vehicle 102 is in a motive mode. If so, control passes to operation 206 to transition to the non-battery-saver mode of operation. If not, control passes to operation 208 to transition to the battery-saver mode of operation. When the modem 110 is in a non-battery-saver mode, some battery saving features in the modem software may be disabled to provide for more reliable radio services. For instance, in the non-battery-saver mode, the TCU 108 measures the RSSI of both the PRX/TX and the DRX antennas 116. This is as compared to the battery-saver mode in which the TCU 108 measures the RSSI of the PRX/TX antenna 116 but not the DRX antennas 116. During normal conditions where the antennas 116 are undamaged, DRX RSSI would be expected to be a little worse than PRX RSSI, as the PRX RF routing would typically use the optimal path in the hardware design. After operations 206 or 208, the process 200 ends.

Figure 3:
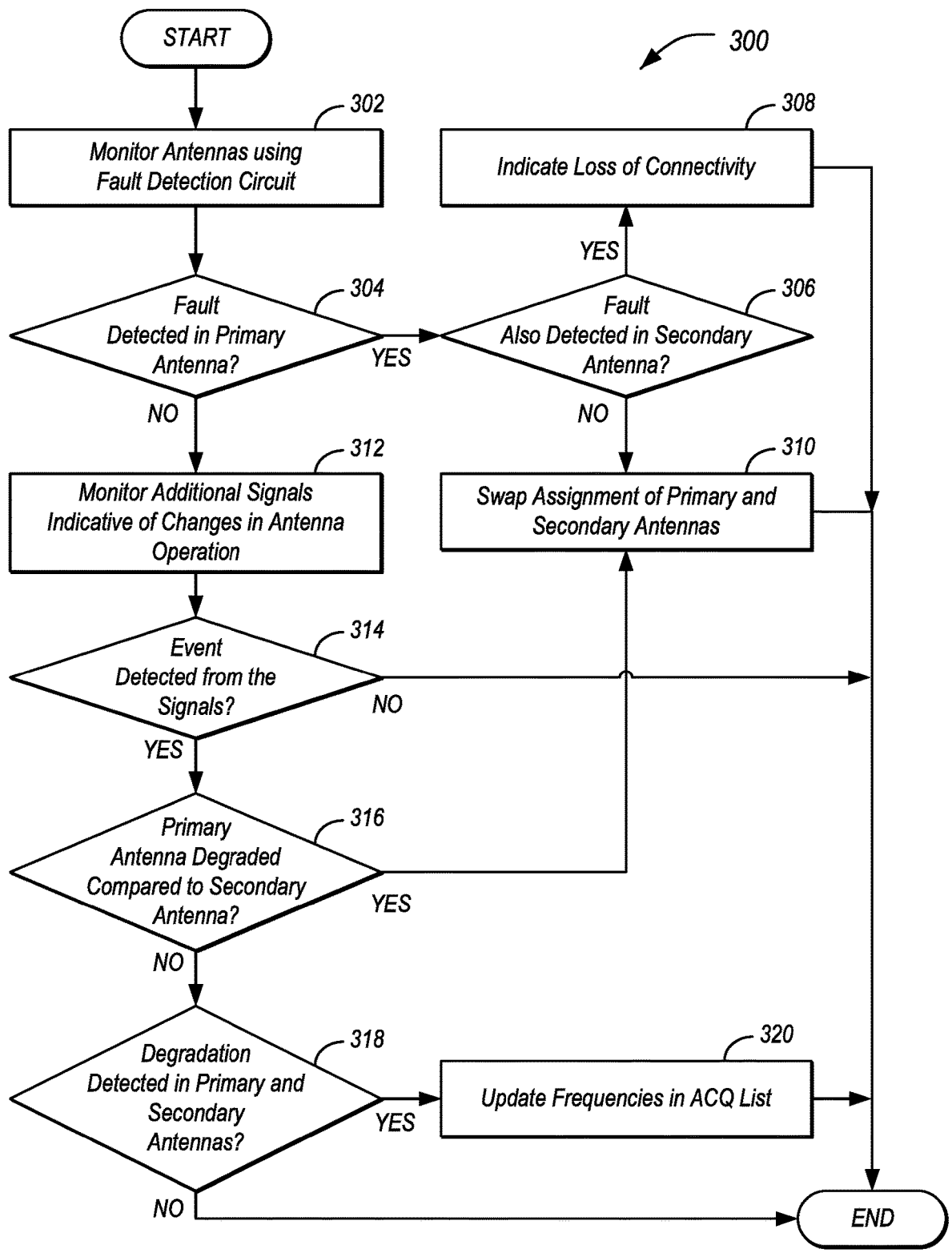
FIG. 3 illustrates an example process for performing telematics controller radio recovery for a vehicle having multiple antennas.

FIG. 3 illustrates an example process 300 for performing TCU 108 radio recovery for a vehicle 102 having multiple antennas 116. In an example, the process 300 may be performed by the TCU 108 executing the control software 124 on the one or more processors 120.

At 302, the TCU 108 monitors the antennas 116 using the fault detection circuit 118. In an example, the fault detection circuit 118 may measure a voltage across each of the antennas 116 to determine whether one or more of the antennas have an open condition or a short. The TCU 108 determines at 304 whether a fault is detected in the primary antenna 116-A. For instance, the one of the antennas 116 currently being used as the PRX/TX may or may not have an open or a short condition. If no fault is detected with the primary antenna 116-A, control passes to operation 312.

If, however, a fault is detected with the primary antenna 116-A, control passes to operation 306 to determine whether a fault is also detected in the secondary antenna 116-B. For instance, the one of the antennas 116 currently being used as the DRX may or may not also have an open or a short condition. If both the primary antenna 116-A and the secondary antenna 116-B have faults, then at 308 the TCU 108 indicates a loss of connectivity. In such a situation, with no working antenna, the TCU 108 may be unable to recover a connection and may raise a DTC indicating that connectivity is unavailable. After operation 308, the process 300 ends. If at 306 the secondary antenna 116-B does not have a fault indicated, control passes to operation 310 to swap assignment of which of the antennas 116 is the PRX/TX and which is the DRX. The TCU 108 may further indicate that the former primary antenna 116-A should no longer be used and may also raise a DTC indicating damage to that antenna 116. After operation 310, the process 300 ends.

At 312, responsive to no fault being detected with the primary antenna 116-A at operation 304, the TCU 108 monitors additional signals indicative of potential changes in operation of the antennas 116. In an example, the TCU 108 monitors in real-time for changes in RSSI measurements from the antennas 116, as a sudden change in RSSI for an antenna 116 may be indicative of damage occurring to an antenna 116. In another example, the TCU 108 monitors the vehicle buses 106 for messaging indicative of an event that could involve damage to the antennas 116. Such a message may include, for instance a message from the powertrain controller 104-A or other controller indicating a sudden change in vehicle 102 speed or engine RPM, or messaging from one or more of the controllers 104 indicative of a sudden change in vehicle 102 direction, orientation, or other unusual event. As another example the message could be indicative of activation of a stability control feature or activation of an occupant safety feature identified based on messaging over the vehicle bus 106 from the ADAS controller 104-D or another controller.

The TCU 108 determines whether an event indicative of a potential change in antenna 116 operation occurred at operation 314. As some examples, if an average RSSI delta between DRX and PRX is larger than a switching threshold (e.g., 10 dB), then control may pass to operation 316. Or, if a change in vehicle 102 speed, a change in vehicle 102 direction, or a change in vehicle 102 orientation is detected via vehicle bus 106 traffic, the TCU 108 may monitor in real-time for changes in the PRX RSSI and DRX RSSI measurements and may pass control to operation 316. If no such changes are detected, then the TCU 108 determines that no antenna 116 adjustments are necessary and the process 300 ends.

At operation 316, the TCU 108 determines whether antenna degradation is detected with the primary antenna 116-A compared to the secondary antenna 116-B. For instance, the TCU 108 may determine whether the RSSI of the primary antenna 116-A has been reduced substantially (e.g., by 10 dB) relative to the secondary antenna 116-B and/or relative to historical levels for the primary antenna 116-A. If so, control passes to operation 210 to swap the primary and secondary antennas 116. If not, control continues to operation 318.

The TCU 108 determines whether antenna degradation is detected with both the primary antenna 116-A and the secondary antenna 116-B at operation 318. For instance, in some cases both (or all) antennas 116 may suffer significant drop in RSSI after occurrence of an event such as a change in vehicle 102 speed and orientation. If so, the TCU 108 may deem both (or all) antennas 116 to be damaged, and control passes to operation 320. If, however, degradation is not identified with either antenna, the process 300 ends.

At 320, the TCU 108 updates frequencies in the ACQ list 114. In an example, the TCU 108 may notify the modem 110 to reorder frequencies in the preferred ACQ list 114. For instance, in one example, a serving cell channel may be in a low-frequency band. Responsive to detection of a dramatic RSSI drop in both PRX and DRX for the low-frequency band being used, the TCU 108 may infer that both antennas have become non-functional in the low band frequencies. Accordingly, in the ACQ process, high band frequencies may be given a higher priority in the preferred ACQ list 114 over the most-recently-used frequencies, so that TCU 108 would not waste resources attempting to decode low band channels. Thus, TCU 108 may be updated to camp onto the communications network 112 more quickly after a situation in which both antennas 116 are damaged. Moreover, during ACQ, the modem 110 may use both PRX and DRX instead of PRX only in a traditional radio protocol, as the specific damage to the antennas 116 may be unknown. After operation 320, the process 300 ends.

Thus, the improved antenna 116 recovery approach introduces new non-battery-saver mode in the TCU 108 to switch to using the best antenna 116 radio frequency (RF) path, not only based on the fault detection circuit 118, but also based on RSSI measurement in the control software 124. In this way, the TCU 108 can perform a fast recovery of the radio connection even when the antenna 116 damage cannot be detected by the fault detection circuit 118. Moreover, as most-recently-used frequency information in the ACQ list 114 may no longer be valid for a damaged antenna 116, the TCU 108 may be further programmed to discount such information in favor of those frequencies that appear to work better after detection of the event causing antenna 116 degradation.

Computing devices described herein, such as the controllers 104 and TCU 108, generally include computer-executable instructions where the instructions may be executable by one or more computing devices such as those listed above. Computer-executable instructions, such as those of the control software 124, may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a plurality of antennas, including a primary antenna assigned as a primary receiver (PRX) and for transmission (TX), and a secondary antenna assigned as a diversity receiver (DRX); and
    a telematics controller programmed to
        responsive to the primary antenna being degraded in received signal strength indication (RSSI) in excess of a first predefined threshold amount compared to the RSSI of the secondary antenna, the first predefined threshold amount being indicative of antenna failure, swap assignment of the primary antenna and the secondary antenna; and
        responsive to the primary antenna and the secondary antenna both being degraded in RSSI in excess of a second predefined threshold amount, the second predefined threshold amount being indicative of antenna damage but not antenna failure, perform a scan of RSSI measurements signals at different frequencies, and update an acquisition (ACQ) list of recently-used frequencies to reorder the frequencies to prefer frequencies having higher RSSI according to the scan.

2. The system of claim 1, wherein the telematics controller is further programmed to send a diagnostic trouble code (DTC) via a vehicle bus responsive to the determination of the primary antenna being degraded compared to the secondary antenna.

3. The system of claim 1, wherein the telematics controller is further programmed to, responsive to detection of an event indicative of a potential change in operation of one or more of the plurality of antennas, determine whether the primary antenna is degraded in received signal strength indication (RSSI) in excess of the first predefined threshold amount compared to the RSSI of the secondary antenna.

4. The system of claim 3, wherein the event is indicated to the telematics controller in a message received by the telematics controller over a vehicle bus.

5. The system of claim 4, wherein the message indicates one or more of a change in vehicle speed, a change in vehicle orientation, a change in engine speed, activation of a stability control feature, or activation of an occupant safety feature.

6. The system of claim 1, further comprising a fault detection configured to measure voltage across at least the primary antenna and the secondary antenna to identify short or open conditions, wherein the telematics controller is further programmed to, responsive to the primary antenna being in a short or open condition, swap assignment of the primary antenna and the secondary antenna.

7. The system of claim 1, wherein the telematics controller and plurality of antennas are included in a vehicle, in a first mode the telematics controller is configured to measure the RSSI of both the primary antenna and the secondary antenna, and in a second mode the telematics controller is configured to measure the RSSI of the primary antenna but not the secondary antenna, and the telematics controller is programmed to:
  transition from the first mode to the second mode responsive to the vehicle exiting a motive mode, and
  transition from the second mode to the first mode responsive to the vehicle entering the motive mode.

8. A method comprising:
  transitioning a telematics controller of a vehicle to a first mode in which the telematics controller is configured to measure received signal strength indication (RSSI) of both a primary antenna and a secondary antenna responsive to the vehicle entering a motive mode;
  responsive to the primary antenna being degraded in RSSI in excess of a predefined threshold amount compared to the RSSI of the secondary antenna, swapping assignment of the primary antenna and the secondary antenna;
  responsive to the primary antenna and the secondary antenna both being degraded in RSSI in excess of a second predefined threshold amount, performing a scan of RSSI measurements of signals at different frequencies, and updating an acquisition (ACQ) list of recently-used frequencies to reorder the frequencies to prefer frequencies having higher RSSI according to the scan; and
  transitioning the telematics controller to a second mode in which the telematics controller is configured to measure RSSI of the primary antenna but not the secondary antenna responsive to the vehicle exiting the motive mode.

9. The method of claim 8, further comprising:
  sending a diagnostic trouble code (DTC) via a vehicle bus responsive to the determination of the primary antenna being degraded compared to the secondary antenna.

10. The method of claim 8, further comprising, responsive to detection of an event indicative of a potential change in operation of one or more of the primary antenna or the secondary antenna, measuring whether the primary antenna is degraded in received signal strength indication (RSSI) in excess of the predefined threshold amount compared to the RSSI of the secondary antenna.

11. The method of claim 10, further comprising indicating the event to the telematics controller in a message received by the telematics controller over a vehicle bus.

12. The method of claim 8, further comprising:
  measuring a voltage across at least the primary antenna and the secondary antenna to identify short or open conditions; and
  responsive to the primary antenna being in a short or open condition, swap assignment of the primary antenna and the secondary antenna.

13. A non-transitory computer readable medium comprising instructions that, when executed by a processor of a telematics controller of a vehicle, cause the telematics controller to:
  transition to a first mode in which the telematics controller is configured to measure received signal strength indication (RSSI) of both a primary antenna and a secondary antenna responsive to the vehicle entering a motive mode;
  responsive to the primary antenna being degraded in RSSI in excess of a predefined threshold amount compared to the RSSI of the secondary antenna, swap assignment of the primary antenna and the secondary antenna;
  responsive to the primary antenna and the secondary antenna both being degraded in RSSI in excess of a second predefined threshold amount, perform a scan of RSSI measurements of signals at different frequencies, and update an acquisition (ACQ) list of recently-used frequencies to reorder the frequencies to prefer frequencies having higher RSSI according to the scan; and
  transition to a second mode in which the telematics controller is configured to measure RSSI of the primary antenna but not the secondary antenna responsive to the vehicle exiting the motive mode.

14. The medium of claim 13, further comprising instructions that, when executed by the processor of the telematics controller, cause the telematics controller to send a diagnostic trouble code (DTC) via a vehicle bus responsive to the determination of the primary antenna being degraded compared to the secondary antenna.

15. The medium of claim 13, further comprising instructions that, when executed by the processor of the telematics controller, cause the telematics controller to, responsive to detection of an event indicative of a potential change in operation of one or more of the primary antenna or the secondary antenna, measure whether the primary antenna is degraded in received signal strength indication (RSSI) in excess of the predefined threshold amount compared to the RSSI of the secondary antenna.

16. The medium of claim 15, further comprising instructions that, when executed by the processor of the telematics controller, cause the telematics controller to indicate the event to the telematics controller in a message received by the telematics controller over a vehicle bus.

17. The medium of claim 13, further comprising instructions that, when executed by the processor of the telematics controller, cause the telematics controller to:
  receive signals from a fault detection circuit configured to measure a voltage across at least the primary antenna and the secondary antenna to identify short or open conditions; and
  responsive to the primary antenna being in a short or open condition, swap assignment of the primary antenna and the secondary antenna.

18. A system comprising:
  a plurality of antennas, including a primary antenna assigned as a primary receiver (PRX) and for transmission (TX), and a secondary antenna assigned as a diversity receiver (DRX); and
  a telematics controller programmed to
    responsive to detection of an event indicative of a potential change in operation of one or more of the plurality of antennas, measure the received signal strength indication (RSSI) of the primary antenna and the secondary antenna, the event being one or more of a change in vehicle speed, a change in vehicle orientation, a change in engine speed, activation of a stability control feature, or activation of an occupant safety feature;

responsive to the primary antenna being degraded in RSSI in excess of a first predefined threshold amount compared to the RSSI of the secondary antenna, the first predefined threshold amount being indicative of antenna failure, swap assignment of the primary antenna and the secondary antenna; and responsive to the primary antenna and the secondary antenna both being degraded in RSSI in excess of a second predefined threshold amount, the second predefined threshold amount being indicative of antenna damage but not antenna failure, perform a scan of RSSI measurements of signals at different frequencies, and update an acquisition (ACQ) list of recently-used frequencies to reorder the frequencies to prefer frequencies having higher RSSI according to the scan.

* * * * *